(12) United States Patent
Raber et al.

(10) Patent No.: US 11,932,981 B2
(45) Date of Patent: Mar. 19, 2024

(54) COUNTERWEIGHT ASSEMBLY AND METHOD OF MANUFACTURING THE SAME

(71) Applicant: SSW Advanced Technologies, LLC, Fort Smith, AR (US)

(72) Inventors: Ralph Ronald Raber, Evansville, IN (US); John Patrick Driver, Henryville, IN (US); Brian J. Stewart, Vincennes, IN (US)

(73) Assignee: SSW Advanced Technologies, LLC, Louisville, KY (US)

( * ) Notice: Subject to any disclaimer, the term of this patent is extended or adjusted under 35 U.S.C. 154(b) by 116 days.

(21) Appl. No.: 17/083,708

(22) Filed: Oct. 29, 2020

(65) Prior Publication Data

US 2021/0123500 A1    Apr. 29, 2021

Related U.S. Application Data

(60) Provisional application No. 62/927,529, filed on Oct. 29, 2019.

(51) Int. Cl.
| | | |
|---|---|---|
| *D06F 37/26* | (2006.01) | |
| *D06F 37/20* | (2006.01) | |
| *D06F 37/22* | (2006.01) | |
| *F16F 15/28* | (2006.01) | |

(52) U.S. Cl.
CPC ............ *D06F 37/265* (2013.01); *D06F 37/22* (2013.01); *F16F 15/28* (2013.01); *F16F 15/286* (2013.01); *D06F 37/20* (2013.01)

(58) Field of Classification Search
CPC ........ D06F 37/20; D06F 37/22; D06F 37/265; F16F 15/28; F16F 15/286
See application file for complete search history.

(56) References Cited

U.S. PATENT DOCUMENTS

| | | | |
|---|---|---|---|
| 2,937,834 | A | 5/1960 | Orenick |
| 3,185,255 | A | 5/1965 | Bird |
| 4,250,724 | A | 2/1981 | Altnau |
| 6,264,393 | B1 | 7/2001 | Kraus |
| 2003/0029206 | A1 | 2/2003 | Cho et al. |
| 2010/0148026 | A1 | 6/2010 | Jang et al. |

(Continued)

FOREIGN PATENT DOCUMENTS

| | | | | |
|---|---|---|---|---|
| CN | 202251657 U | | 5/2012 | |
| CN | 104441203 B | * | 4/2018 | ............... B28B 1/14 |

(Continued)

OTHER PUBLICATIONS

Electronic translation of CN-104441203-B. (Year: 2018).*
International Search Report for application No. PCT/US2014/060794, dated Feb. 9, 2015.

*Primary Examiner* — Joseph L. Perrin
(74) *Attorney, Agent, or Firm* — MARSHALL, GERSTEIN & BORUN LLP; Michael P. Furmanek (57) ABSTRACT

A counterweight assembly for counteracting vibrations or other forces in an appliance or machine includes a body and a funnel coupled to the body. The body includes an outer surface and an inner surface that defines an internal cavity that is adapted to receive a heavy aggregate material to form a counterweight. The funnel extends outwardly from the body and is adapted to deliver the heavy aggregate material to the internal cavity of the body.

19 Claims, 9 Drawing Sheets

(56) References Cited

U.S. PATENT DOCUMENTS

2011/0094432 A1     4/2011   Petersen et al.
2012/0242211 A1     9/2012   Chang
2016/0258508 A1*   9/2016   Ambrose ................ F16F 15/28

FOREIGN PATENT DOCUMENTS

| EP | 1270791 | A2 | | 1/2003 | |
|----|---------|----|----|--------|---|
| EP | 1426477 | A2 | | 6/2004 | |
| GB | 2559559 | A | * | 8/2018 | ........... D06F 37/225 |
| KP | 20050004632 | | | 1/2005 | |

* cited by examiner

COUNTERWEIGHT ASSEMBLY AND METHOD OF MANUFACTURING THE SAME

CROSS-REFERENCE TO RELATED APPLICATION

Priority is claimed to U.S. Provisional Patent Application No. 62/927,529, filed Oct. 29, 2019, the entire contents of which are hereby incorporated by reference herein.

FIELD OF THE DISCLOSURE

The present disclosure generally relates to counterweight assemblies and, more particularly, to counterweight assemblies commonly used within appliances such as washers, dryers, rangers, dishwashers, and refrigerators; consumer products including file cabinets, chairs, sofas, tables, chests, cabinets, shelving systems; or other consumer products that conceivably could use counterweights for balancing various mechanical loads and/or forces.

BACKGROUND

Counterweights can play a role in the stabilization of appliances or machines that are subject to vibrations or other forces the cause the appliance or machine to move. A counterweight counteracts the vibrations or other forces exerted on an appliance or machine by exerting a force that is opposite of the vibrations or other forces. In doing so, the opposite force exerted by the counterweight cancels out the vibrations or other forces exerted on the appliance or machine allowing the appliance or machine to function not only properly but as efficiently as possible as well.

SUMMARY

In accordance with a first exemplary aspect of the present disclosure, a counterweight assembly is provided. The counterweight assembly includes a body having an outer surface and an inner surface that defines an internal cavity adapted to receive a heavy aggregate material to form a counterweight. The counterweight assembly also includes a funnel coupled to the body and extends outwardly from the body. The funnel is adapted to deliver the heavy aggregate material to the internal cavity of the body.

In some versions, the funnel is integrally formed with the body.

In some versions, the funnel is releasably coupled to the body.

In some versions, the funnel is releasably coupled to the body via a friction fit.

In some versions, the funnel defines a passage and the body defines an opening. The passage and the opening are coupled, and facilitate communication between the funnel and the internal cavity of the body.

In some versions, the funnel includes at least two diverging, upstanding walls.

In some versions, the body includes at least one aperture that is adapted to receive a securement mechanism. The securement mechanism is configured to retain the body in an operable connection with a counterweight receiving component.

In some versions, the securement mechanism is a fastener.

In some versions, the outer surface of the body has an arcuate shape.

In some versions, a heavy aggregate material is disposed in the internal cavity of the body.

In accordance with a second exemplary aspect of the present disclosure, a counterweight assembly is provided. The counterweight assembly includes a body having an outer surface, an internal surface that defines an internal cavity, and at least one aperture adapted to receive a securement mechanism. A heavy aggregate material is disposed within the internal cavity of the body. A funnel extends outwardly from the body and is adapted to deliver the heavy aggregate material to the internal cavity of the body. A counterweight receiving component defining at least one aperture. The securement mechanism is received by the at least one aperture of the counterweight receiving component and the at least one aperture of the body. So configured, the securement mechanism operably couples the body to the counterweight receiving component.

In some versions, the funnel is integrally formed with the body.

In some versions, the funnel is removably coupled to the body.

In some versions, the funnel is removably coupled to the body via a friction fit.

In some versions, the funnel defines a passage and the body defines an opening. The passage and the opening are coupled, and thereby facilitate communication between the funnel and the internal cavity of the body.

In some versions, the funnel includes at least two diverging upstanding walls.

In some versions, the outer surface of the body has an arcuate shape.

In accordance with a third exemplary aspect of the present disclosure, a method of manufacturing a counterweight assembly in accordance with the teachings of the present disclosure is provided. The method includes forming a body having an outer surface and an inner surface defining an internal cavity. The method also includes forming a funnel extending outwardly from the body. The funnel defines a passage that is in communication with an opening in the body. The method includes filling, at least partly, the internal cavity of the body with a heavy aggregate material via the funnel. The method also includes curing the heavy aggregate material disposed in the internal cavity of the body.

In some versions, forming the funnel includes forming the funnel integrally with the body.

In some versions, forming the funnel includes forming the funnel separate from the body and further includes releasably coupling the funnel to the body.

In some versions, filling the body includes filling the body with the heavy aggregate material such that at least a portion of the heavy aggregate material is disposed within the funnel.

In some versions, the method also includes vibrating the body such that the heavy aggregate material moves toward an end of the body that is opposite the funnel.

In some versions, vibrating the body includes vibrating the body such that the portion of the heavy aggregate material disposed within the funnel enters the body as the heavy aggregate material disposed in the body moves toward the end of the body opposite the funnel.

In some versions, the method includes removing the funnel from the body after filling the internal cavity of the body with the heavy aggregate material.

In some versions, removing the funnel includes cutting the funnel from the body.

In some versions, removing the funnel includes releasing a mechanical connection between the funnel and the body.

BRIEF DESCRIPTION OF THE DRAWINGS

The features of this disclosure which are believed to be novel are set forth with particularity in the appended claims.

The present disclosure may be best understood by reference to the following description taken in conjunction with the accompanying drawings, in which like reference numerals identify like elements in the several figures, in which.

DETAILED DESCRIPTION

The present disclosure is generally directed to a counterweight assembly having a body and a funnel coupled to the body for aiding in assembly and manufacture of the counterweight assembly. The disclosed counterweight assembly provides numerous benefits over known counterweight assemblies. First, the funnel of the disclosed counterweight assembly improves filling of the body with a heavy aggregate material because the funnel helps direct the heavy aggregate material into the body. This can also result in quicker fill times of counterweight assemblies over known counterweight assemblies.

Second, the funnel of the disclosed counterweight assembly can act as a reserve for the heavy aggregate material placed in the body because the funnel, by virtue of its size and shape, may hold an excess amount of the heavy aggregate material placed in the body. The heavy aggregate material retained within the funnel can beneficially provide additional heavy aggregate material to the body during vibration of the counterweight assembly. In particular, as the counterweight assembly is subject to vibration, the heavy aggregate material disposed in the body shifts causing air or other gases trapped in the heavy aggregate material to travel out of the body. As the heavy aggregate material settles within the body and become more concentrated toward an end that is opposite of the funnel, the space previously occupied by the air or other gases must be filled to have a properly balanced counterweight assembly. The excess heavy aggregate material retained within the funnel automatically enters the body to fill the space previously occupied by air or other gases. Beneficially, this allows the body to automatically fill itself without the intervention of a person.

Third, as the heavy aggregate material settles within the body due to, for example, exposing the body to vibration, liquids and material lighter than the heavy aggregate material separate from the heavy aggregate material and rise until they are disposed near the funnel. In doing so, the heaviest materials within the body settle to the bottom of the mold, or the side opposite of the funnel. Beneficially, this provides for more consistent weight tolerances for engineered counterweights.

Fourth, the funnel may also retain water or other liquids used in the heavy aggregate material that fills the body to form the counterweight. In particular, as the body is subject to vibration, any water or fluid mixed with the heavy aggregate material rises to the top of the body as the heavy aggregate material settles toward a bottom of the body. In known counterweight assemblies, the water or other fluid may overflow out of the body in response to the heavy aggregate material settling in the body. This causes a portion of the heavy aggregate material to be exposed to the atmosphere, which may result in cracking or other impurities of the heavy aggregate material as the heavy aggregate material cures. The disclosed funnel, however, advantageously reduces the possibility of cracks or other impurities forming in the heavy aggregate material by retaining the water or other fluid mixed with the heavy aggregate material within the funnel. This creates a layer of fluid between the heavy aggregate material and the atmosphere, which acts as a barrier to minimize or prevent the cracks or other impurities that may result in the heavy aggregate material when using known counterweight assemblies.

An additional benefit provided by retaining water or other liquids in the funnel is that the retained water or other liquid in the funnel can eliminate the need for using steam during a heated curing process because the standing water acts as a moisture barrier that facilitates complete hydration, or curing, of the exposed surface of and within the counterweight. In a heated curing process, a counterweight assembly is subjected to, for example, temperatures of 100° F. or greater to help cure the concrete disposed in the body of the counterweight assembly. Exposure to such hot temperatures, however, causes a high rate of evaporation within the concrete, which can lead to uncontrolled thermal cracking and ultimately compromises the concrete strength and durability. Thus, steam was commonly used to maintain a constant moisture content in the concrete to prevent such undesirable thermal expansion. The disclosed funnel advantageously allows for the only exposed portion of the concrete of the counterweight assembly to continuously remain moist during heat curing because of the moisture barrier formed by the water retained within the funnel thereby minimizing the possibility for uncontrolled thermal cracking. Accordingly, the disclosed counterweight assembly can be heat cured or cured at ambient temperatures without the use of steam.

Turning now to FIGS. 1-5, which depict a first embodiment of a counterweight assembly 100 constructed in accordance with the teachings of the present disclosure, and used in, for example, washers to counteract the vibrations and other forces encountered by the washer during normal operation. The example counterweight assembly 100 of FIGS. 1-5 includes a body 104 having a first end 108 and a second end 112, a funnel 116 disposed at the first end 108 of the body 104, and at least one aperture 120 disposed between the first and second ends 108, 112 of the body 104. The body 104 may be made of a hard plastic, rubber, metal, or Styrofoam and includes a first outer surface 124 and a second outer surface 128 that are connected via a sidewall 132. By connecting the first and second outer surfaces 124, 128 with the sidewall 132, an internal cavity 136 (FIG. 3), which receives a heavy aggregate material (e.g., concrete, sand, gravel, stone, crushed stone, slag, recycled concrete, or geosynthetic aggregates) to form a counterweight, is formed between the first outer surface 124, the second outer surface 128, and the sidewall 132. The first outer surface 124, the second outer surface 128, and the sidewall 132 of the body 104 may take any shape or form suitable for the intended industrial/commercial applications. For example, as illustrated in the example counterweight assembly 100 of FIGS. 1-5, the body 104 includes an arcuate shape or C-shape. However, it is envisioned that the body 104 may have a rectangular shape, a triangular shape, a trapezoidal shape, a linear shape, or any other shape, in other embodiments of the counterweight assembly 100.

Figure 1:
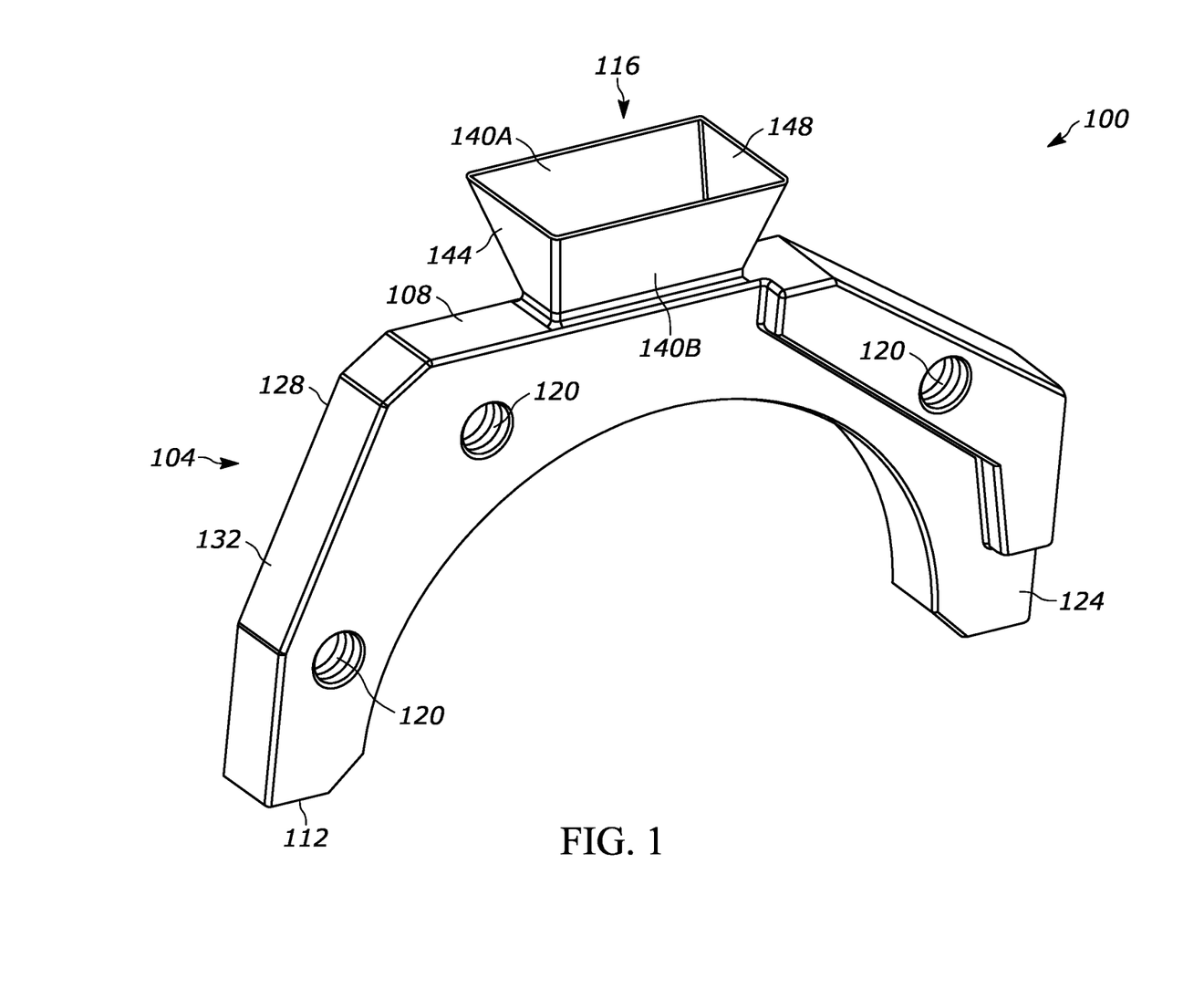
FIG. 1 is a perspective view of a first embodiment of a counterweight assembly, constructed in accordance with the teachings of the present disclosure.
Figure 2:
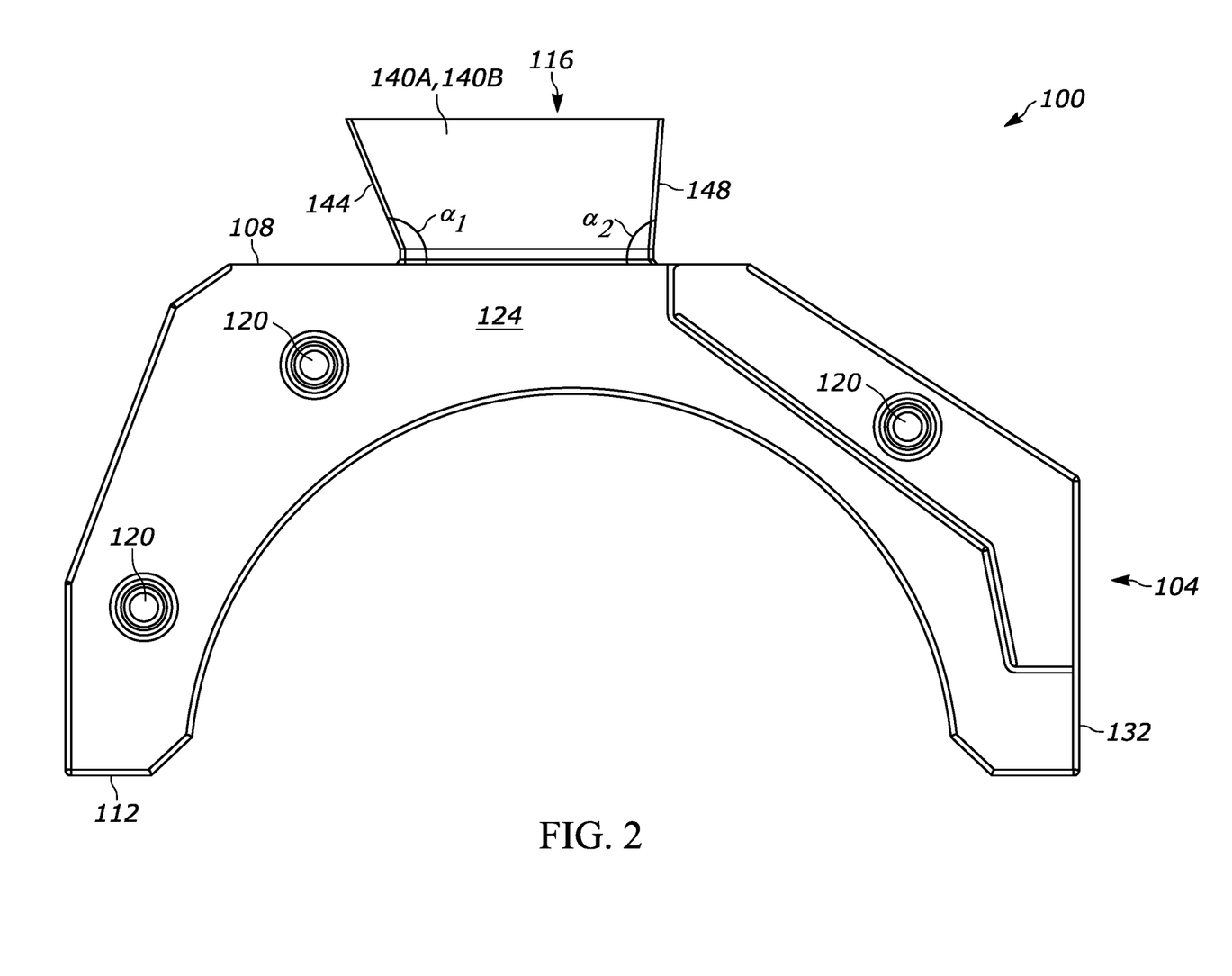
FIG. 2 is a front elevation view of the first embodiment of the counterweight assembly illustrated in FIG. 1.

In the example counterweight assembly of FIGS. 1-5, the funnel 116 is integrally formed with the body 104 and is adapted to provide the internal cavity 136 with the heavy aggregate material. The funnel 116 may be formed through blow molding, injection molding, casting, three dimensional printing, or any other suitable method of manufacturing for the intended industrial/commercial application. In particular, the funnel 116 includes at least two diverging, upstanding walls 140A, 140B that extend outwardly from the first end 108 of the body 104. The funnel 116 also includes first and second sidewalls 144, 148 that extend between the at least two diverging, upstanding walls 140A, 1408 to form the funnel 116. The first sidewall 144 extends upwardly from the first end 108 of the body 104 at a first angle $\alpha_1$ while the second sidewall 148 extends upwardly from the first end 108 of the body 104 at a second angle $\alpha_2$. As best illustrated in FIG. 2, the first angle $\alpha_1$ is greater than the second angle $\alpha_2$. So configured, the second sidewall 148 extends from the top end 108 of the body 104 at an angle $\alpha_2$ that is substantially perpendicular to the top end 108 of the body 104 while the first sidewall 144 extends from the top end 108 of the body 104 at an angle $\alpha_1$ greater than 90°, but less than 180°. In one example, the first angle $\alpha_1$ can be between 45° and 70°. In another example, the first angle $\alpha_1$ can be between 30° and 60°. In yet other examples, the first angle $\alpha_1$ can be between 60° and 90°. In other examples, the second angle $\alpha_2$ can be between 90° and 70°. In yet other examples, the second angle $\alpha_2$ can be between 80° and 60°. However, in other example embodiments of the funnel 116, the first and second angles $\alpha_1$, $\alpha_2$ can be substantially the same. Moreover, the funnel 116, as illustrated in FIGS. 1-5, includes a rectangular cross-section.

However, in other embodiments, the funnel 116 can include a square cross-section, a circular cross-section, hexagonal cross-section, polygonal cross-section, or other shaped cross-section. Additionally, the funnel 116 may be formed of the same material as the body 104. However, in other example, the funnel 116 can be formed of a first material (e.g., a soft plastic, a hard plastic, a rubber, a polymer, a metal, a Styrofoam, etc.) and the body 104 can be formed of a second material (e.g., a soft plastic, a hard plastic, a rubber, a polymer, a metal, a Styrofoam, etc.).

Figure 3:
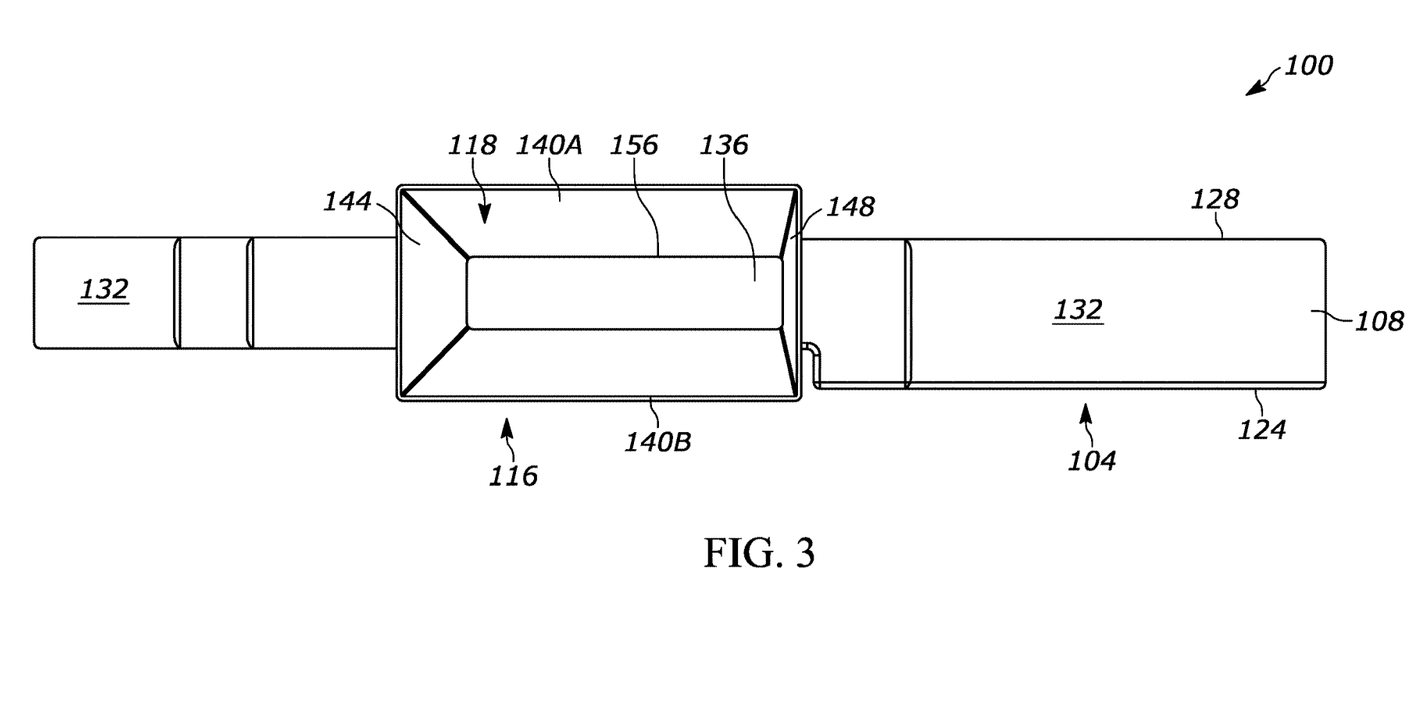
FIG. 3 is a top down view of the first embodiment of the counterweight assembly illustrated in FIG. 1.
Figure 4:
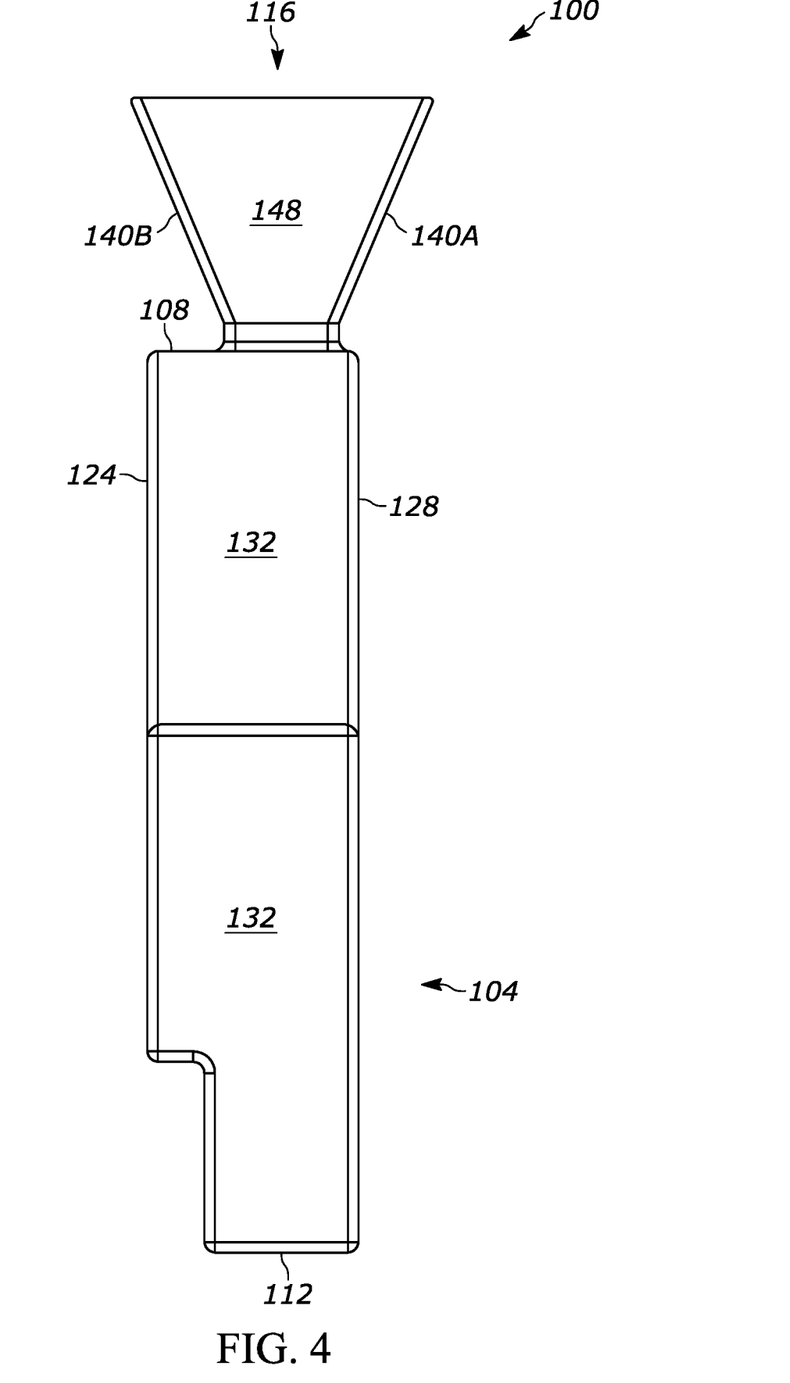
FIG. 4 is a side view of the first embodiment of the counterweight assembly illustrated in FIG. 1.

Moreover, as best illustrated in FIG. 3, the funnel 116 further defines a passage 118 and the body 104 further defines an opening 156. The passage 118 of the funnel 116 is coupled to the opening 156 of the body 104 and the opening 156 of the body 104 is in communication with the passage 118 of the funnel 116 for conveying the heavy aggregate material poured into the funnel 116 to the internal cavity 136 of the body 104. In particular, the passage 118 formed by the funnel 116 converges toward the opening 156 formed by the body 104 to direct the flow of heavy aggregate material into the opening 156 and ultimately into the internal cavity 136 of the body 104.

Figure 5:
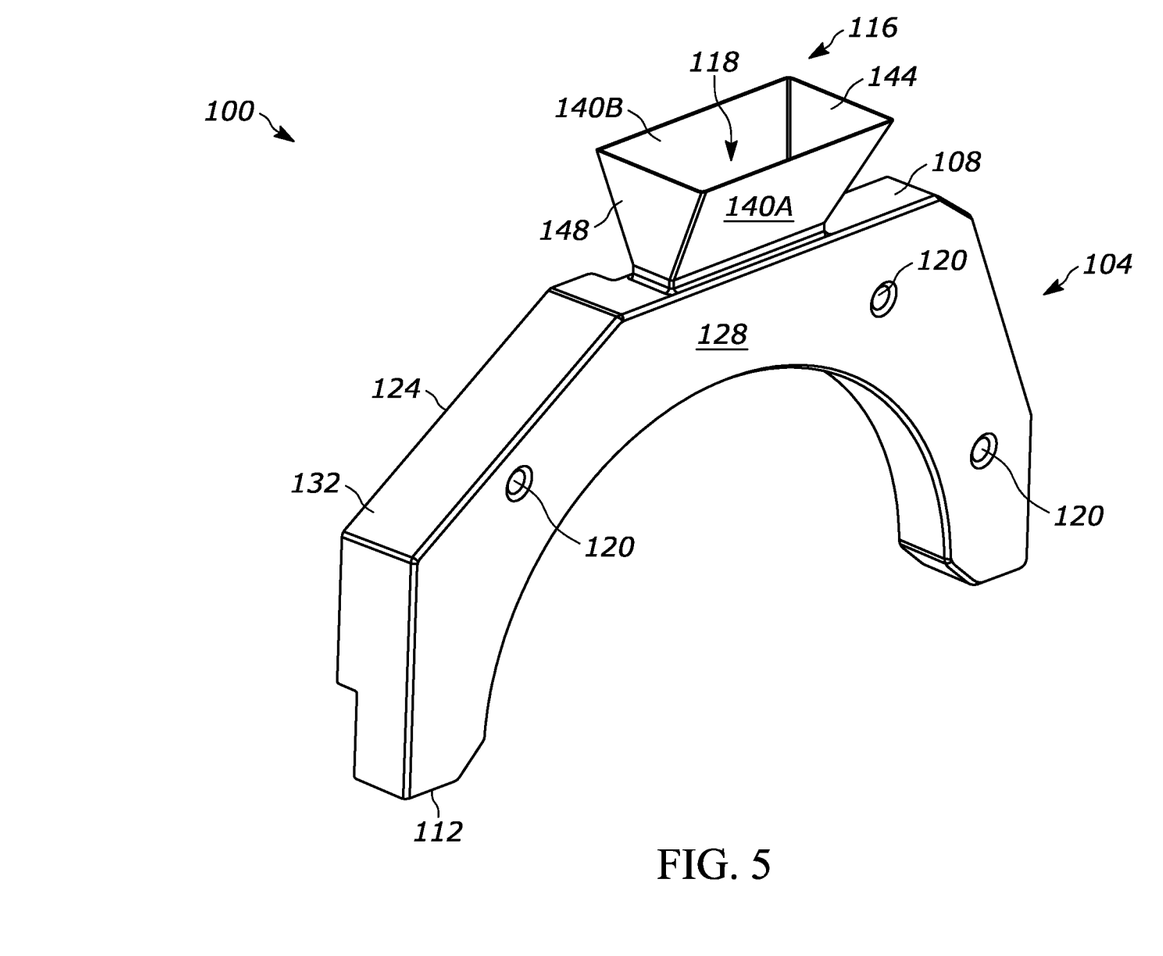
FIG. 5 is a front perspective view of a second embodiment of a counterweight assembly, constructed in accordance with the teachings of the present disclosure.

The body 104 also includes at least one aperture 120 that is adapted to receive a securement mechanism (not shown), such as, for example, a fastener, screw, bolt, etc. The at least one aperture 120 is disposed on the first outer surface 124 of the body 104, extends through the internal cavity 136, and through the second outer surface 128 of the body 104. As illustrated in FIGS. 1, 2, and 5, the body 104 includes three apertures 120 that are disposed in various locations on the body 104. However, in other example embodiments of the body 104, there can be more or less than three apertures 120 depending on the particular application of the counterweight assembly 100.

Further, the body 104 is configured to be coupled to a counterweight receiving component (not shown) such as, for example, a drum of a clothes washer. In particular, the counterweight receiving component may be any part of an appliance or machine that securely receives the counterweight assembly 100 to counteract vibrations or other forces. The counterweight receiving component also may include at least one aperture (not shown). In some example counterweight receiving components, the at least one aperture is positioned complementary to the at least one aperture 120 of the body 104. So configured, the securement mechanism (not shown) may engage both the body 104 of the counterweight assembly 100 and the counterweight receiving component to couple the body 104 to the counterweight receiving component. In particular, the securement mechanism may pass through the first and second outer surfaces 124, 128 of the body 104 via the at least one aperture 120 and engage the at least one aperture of the counterweight receiving component. However, other mechanism for securing the body 104 to the counterweight receiving component are contemplated.

Figure 6:
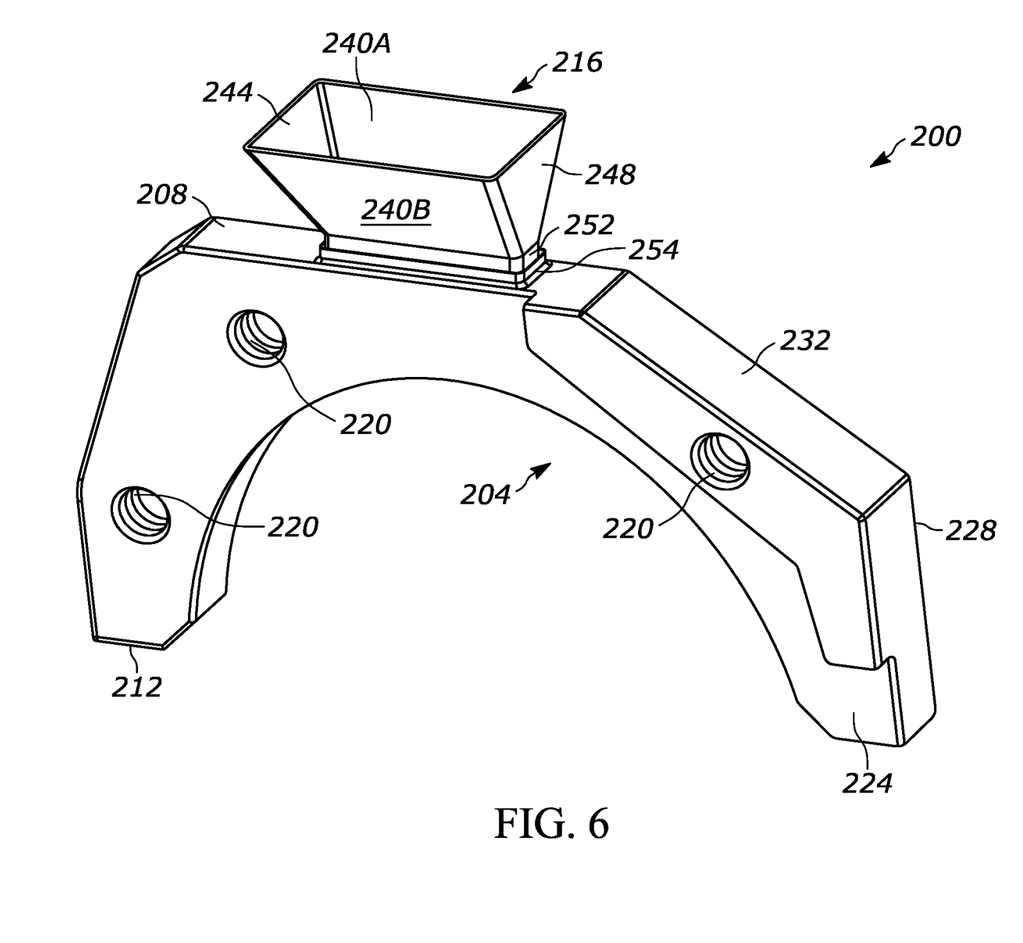
FIG. 6 is a rear perspective view of the second embodiment of the counterweight assembly illustrated in FIG. 5.
Figure 7:
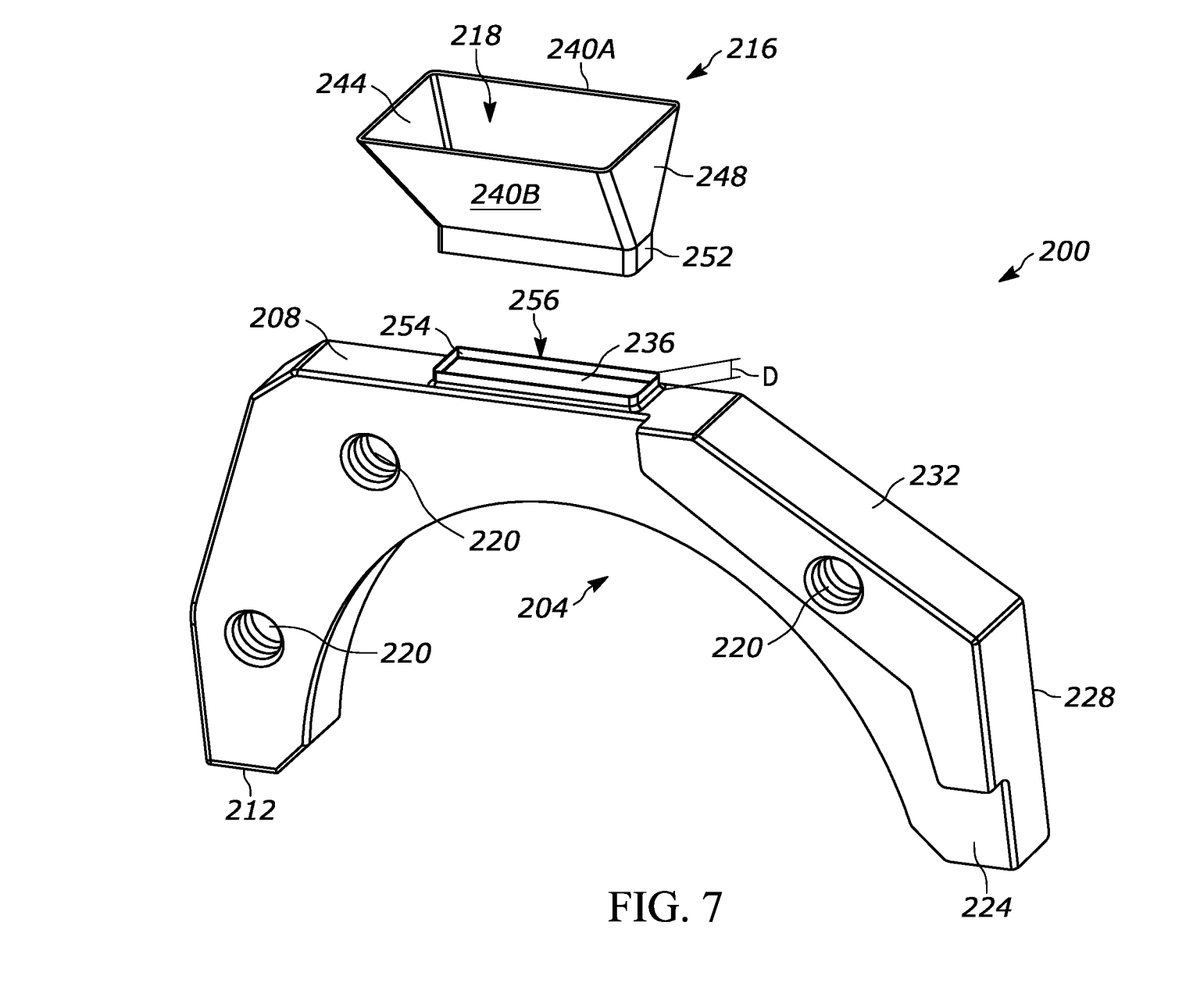
FIG. 7 is a front exploded view of the second embodiment of the counterweight assembly illustrated in FIG. 5.
Figure 8:
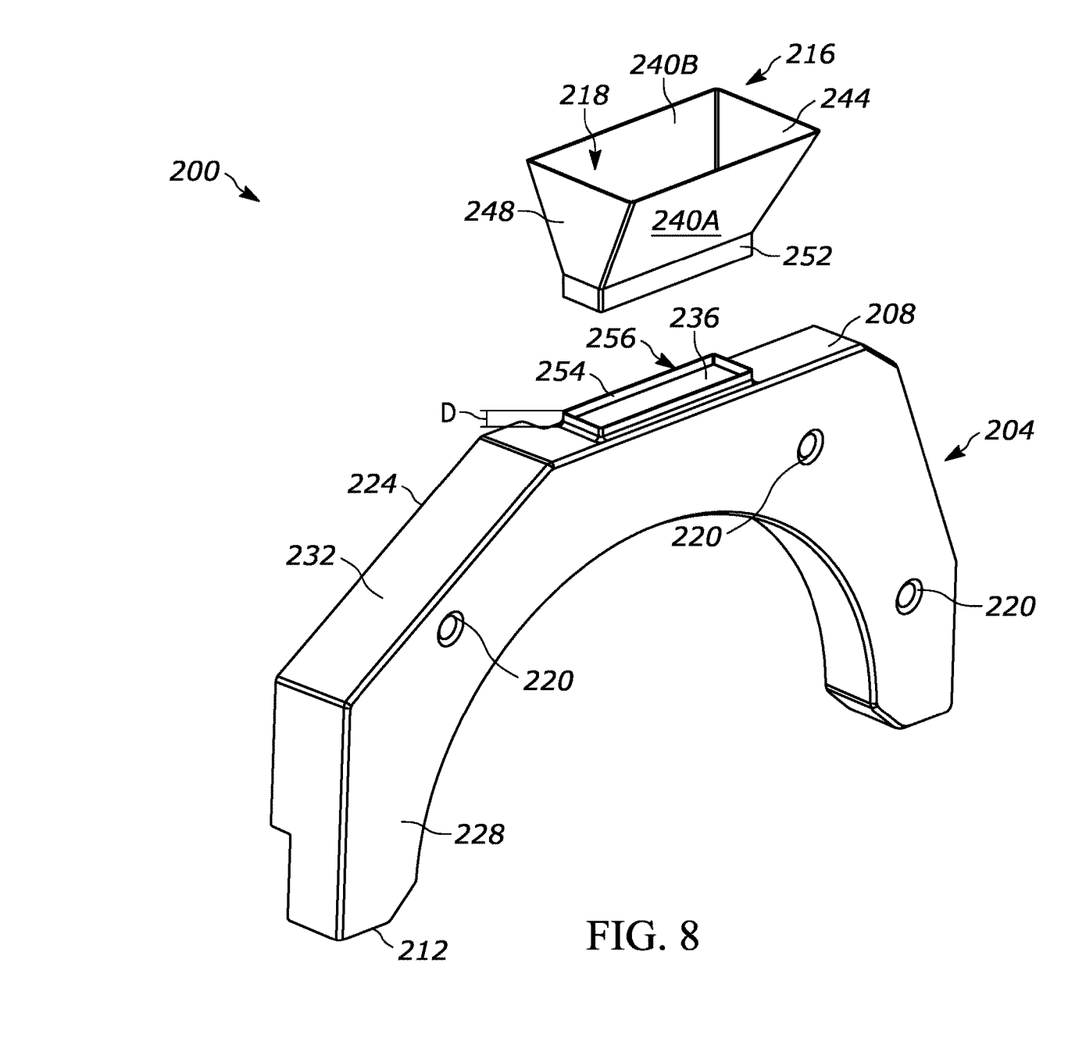
FIG. 8 is a rear exploded view of the second embodiment of the counterweight assembly illustrated in FIG. 5.

Turning now to FIGS. 6-8, which illustrate a second embodiment of the counterweight assembly 200. The second embodiment of the counterweight assembly 200 illustrated in FIGS. 6-8 is substantially similar to the counterweight assembly 100 illustrated in FIGS. 1-5, except the funnel 216 of the second embodiment of the counterweight assembly 200 is removably attached to the body 204 rather than being integrally formed with the body 104 as in the first example counterweight assembly 100. Thus, for ease of reference, and to the extent possible, the same or similar components of the counterweight assembly 200 will retain the same reference numbers as outlined above with respect to the first embodiment of the counterweight assembly 100, although the reference numbers will be increased by 100.

Similar to the first embodiment of the counterweight assembly 100, the second embodiment of the counterweight assembly 200 includes a body 204 having a first end 208 and a second end 212, a funnel 216 disposed at the first end 208 of the body 204, and at least one aperture 220 disposed between the first and second ends 208, 212 of the body 204. The body 204 may be made of a hard plastic, rubber, metal, or Styrofoam and includes a first outer surface 224 and a second outer surface 228 that are connected via a sidewall 232. By connecting the first and second outer surfaces 224, 228 with the sidewall 232, an internal cavity 236 (FIGS. 7 and 8), which receives a heavy aggregate material (e.g., concrete, sand, gravel, stone, crushed stone, slag, recycled concrete, or geosynthetic aggregates) to form a counterweight, is formed between the first outer surface 224, the second outer surface 228, and the sidewall 232. The first outer surface 224, the second outer surface 228, and the sidewall 232 of the body 204 may take any shape or form suitable for the intended industrial/commercial application. For example, as illustrated in the example counterweight assembly 200 of FIGS. 6-8, the body 204 includes an arcuate shape or C-shape. However, the body 204 may have a rectangular shape, a triangular shape, a trapezoidal shape, a linear shape, or any other shape, in other embodiments of the counterweight assembly 200.

In the second embodiment of the counterweight assembly 200 illustrated in FIGS. 6-8, the funnel 216 is removably coupled to the body 204 and, similar to the first embodiment of the counterweight assembly 100, is adapted to provide the internal cavity 236 of the body 204 with the heavy aggregate material. The funnel 216 may be formed through blow molding, injection molding, casting, three dimensional printing, or any other suitable method of manufacturing for the intended industrial/commercial application. In particular, the funnel 216 includes at least two diverging, upstanding walls 240A, 240B that extend outwardly from a base 252 of the funnel 216. The funnel 216 also includes first and second sidewalls 244, 248 that extend between the at least two diverging, upstanding walls 240A, 240B to form the funnel 216. The first sidewall 244 extends upwardly from the base 252 of the funnel 216 at a first angle $\alpha_1$ while the second sidewall 248 extends upwardly from the base 252 of the funnel 216 at a second angle $\alpha_2$. In the example illustrated in FIGS. 7 and 8, the first angle $\alpha_1$ is greater than the second angle $\alpha_2$. So configured, the second sidewall 248 extends from the base 252 of the funnel 216 at an angle $\alpha_2$ that is substantially perpendicular to the base 252 of the funnel 216 while the first sidewall 244 extends from the base 252 of the funnel 216 at an angle $\alpha_1$ greater than 90°, but less than 180°. In one example, the first angle $\alpha_1$ can be between 45° and 70°. In another example, the first angle $\alpha_1$ can be between 30° and 60°. In yet other examples, the first angle $\alpha_1$ can be between 60° and 90°. In other examples, the second angle $\alpha_2$ can be between 90° and 70°. In yet other examples, the second angle $\alpha_2$ can be between 80° and 60°. However, in other example embodiments of the funnel 216, the first and second angles $\alpha_1$, $\alpha_2$ can be substantially the same.

Moreover, the funnel 216, as illustrated in FIGS. 6-8, includes a rectangular cross-section. However, in other embodiments, the funnel 216 can include a square cross-section, a circular cross-section, hexagonal cross-section, polygonal cross-section, or other shaped cross-section. Additionally, the funnel 216 may be formed of the same material as the body 204. However, in other examples, the funnel 216 can be formed of a first material (e.g., a soft plastic, a hard plastic, a rubber, a polymer, a metal, a Styrofoam, etc.) and the body 204 can be formed of a second material (e.g., a soft plastic, a hard plastic, a rubber, a polymer, a metal, a Styrofoam, etc.).

The body 204 also includes at least one aperture 220 that is adapted to receive a securement mechanism (not shown), such as, for example, a fastener, screw, bolt, etc. The at least one aperture 220 is disposed on the first outer surface 224 of the body 204, extends through the internal cavity 236, and through the second outer surface 228 of the body 204. As illustrated in FIGS. 6-8, the body 204 includes three apertures 220 that are disposed in various locations on the body 204. However, in other example embodiments of the body 204, there can be more or less than three apertures 220 depending on the particular application of the counterweight assembly 200.

Further, the body 204 is configured to be coupled to a counterweight receiving component (not shown) such as, for example, a drum of a clothes washer. In particular, the counterweight receiving component may be any part of an appliance or machine that securely receives the counterweight assembly 200 to counteract vibrations or other forces. The counterweight receiving component also may include at least one aperture (not shown). In some example counterweight receiving components, the at least one aperture is positioned complementary to the at least one aperture 220 of the body 204. So configured, the securement mechanism (not shown) may engage both the body 204 of the counterweight assembly 200 and the counterweight receiving component to couple the body 204 to the counterweight receiving component. In particular, the securement mechanism may pass through the first and second outer surfaces 224, 228 of the body 204 via the at least one aperture 220 and engage the at least one aperture of the counterweight receiving component. However, other mechanism for securing the body 204 to the counterweight receiving component are contemplated.

The body 204 illustrated in FIGS. 7 and 8 further includes a collar 254 surrounding the opening 256 that is adapted to receive the funnel 216. In particular, the collar 254 extends from the top surface 208 of the body 204 for a distance D such that the collar 254 of the body 204 is sized complimentary to the base 252 of the funnel 216. So configured, the collar 254 may receive and retain the funnel 216 via, for example, a friction fit. However, other embodiments of the body 204 may include other retaining mechanism for securely receiving and retaining the funnel 216. For example, the body 204 can receive the funnel 216 via a hook and groove, a fastener, a snap fit lock, etc., and while the funnel 216 illustrated in FIGS. 7 and 8 includes a square or rectangular cross-section, alternative embodiments of the funnel 216 can be circular and fastened to the body 204 with one or more threads. In either attachment mechanism between the funnel 216 and the body 204, at least a portion of the base 252 of the funnel 216 is disposed within the opening 256 of the body 204. So configured, the body 204 releasably retains the funnel 216 by virtue of the base 252 of the funnel 216 engaging and interacting with the opening 256 of the body 204.

Moreover, as best illustrated in FIGS. 7 and 8, the funnel 216 further defines a passage 218. The passage 218 of the funnel 216 is coupled to the opening 256 of the body 204 and the opening 256 of the body 204 is in communication with the passage 218 of the funnel 216 for conveying the heavy aggregate material poured into the funnel 216 to the internal cavity 236 of the body 204. In particular, the passage 218 formed by the funnel 216 converges toward the opening 256 formed by the body 204 to direct the flow of heavy aggregate material into the opening 256 and ultimately into the internal cavity 236 of the body 204.

Figure 9:
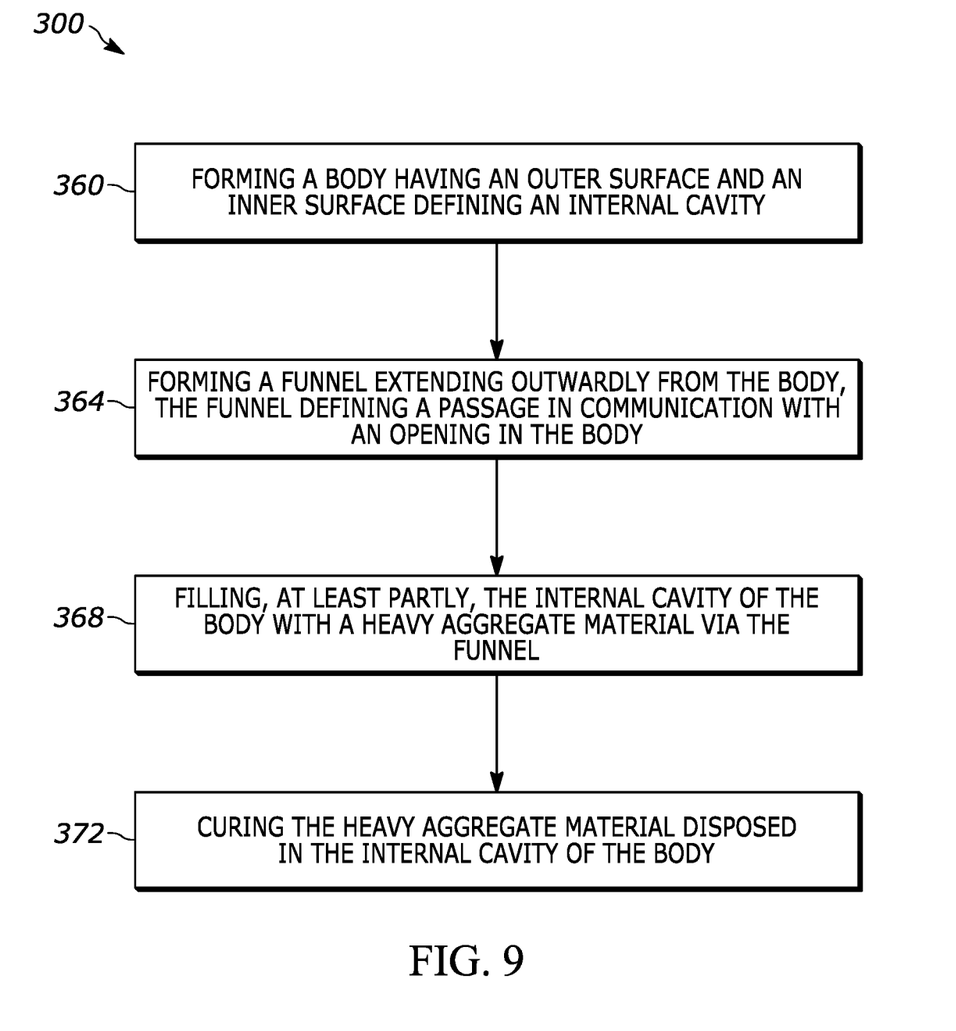
FIG. 9 depicts a flow chart illustrating an example method of manufacturing a counterweight assembly constructed in accordance with the teachings of the present disclosure.

FIG. 9 illustrates a flow chart depicting an example method (300) of manufacturing a counterweight assembly constructed in accordance with the teachings of the present disclosure. The method (300) includes forming (360) a body having an outer surface and an inner surface defining an internal cavity. The method then includes forming (364) a funnel extending outwardly from the body. The funnel defines a passage that is in communication with an opening in the body. In some examples, forming the funnel includes forming the funnel integrally with the body. However, in other examples, forming the funnel includes forming the funnel separate from the body and releasably coupling the funnel to the body. The method (300) then includes filling (368), at least partly, the internal cavity of the body with the heavy aggregate material via the funnel. In some example methods, filling (364) the body further includes filling the body such that a portion of the heavy aggregate material is disposed within the funnel. Finally, the method (300) includes curing (372) the heavy aggregate material disposed in the internal cavity of the body.

While not illustrated in FIG. 9, the method (300) may include other various steps to manufacture a counterweight assembly in accordance with the teachings of the present disclosure. For example, the method (300) can also include vibrating the body, or subjecting the body to a vibration, such that the heavy aggregate material moves toward an end of the body that is opposite the funnel. In such an example, the heavy aggregate material at least partially disposed within the funnel enters the body to fill the empty spaces previously occupied by loose heavy aggregate material. The method (300) may further include removing the funnel from the body after filling the internal cavity of the body with the heavy aggregate material. For example, when the funnel is integrally formed with the body, such as the funnel 116 of the first embodiment of the counterweight assembly 100, the funnel can be removed from the body via cutting. In other examples, such as the second embodiment of the counterweight assembly 200 where the funnel 216 is removably attached to the body 204, the funnel can be removed from the body by releasing a mechanical connection between the funnel and the body. Alternatively, in such examples where the funnel is removably attached to the body (i.e., via friction fit), the funnel may be removed from the body by applying a force to the funnel in a direction away from the body.

Those skilled in the art will recognize that a wide variety of modifications, alterations, and combinations can be made with respect to the above described examples without departing from the scope of the disclosure, and that such modifications, alterations, and combinations are to be viewed as being within the ambit of the inventive concept.

We claim:

1. A counterweight assembly, the assembly comprising:
a body having an outer surface and an inner surface, the inner surface defining an internal cavity adapted to receive a heavy aggregate material to form a counterweight, the body defining an elongate opening to the internal cavity; and
a funnel coupled to the body and extending outwardly from the body, the funnel defining a passage adapted to deliver the heavy aggregate material to the internal cavity of the body through the elongate opening defined therein;
wherein the passage of the funnel is defined by an elongate spout configured to couple to the elongate opening to the internal cavity of the body and one or more walls extending away from the elongate spout, the one or more walls comprising opposite portions diverging away from one another and extending away from the elongate spout at angles with respect thereto;
wherein the body includes a central body portion having an elongate interior and lateral body portions disposed on and depending downwardly from opposite sides of the central body portion, and the elongate opening to the internal cavity is defined through a top wall of the central body portion.

2. The counterweight assembly of claim 1, wherein the funnel is integrally formed with the body.

3. The counterweight assembly of claim 1, wherein the funnel is releasably coupled to the body.

4. The counterweight assembly of claim 3, wherein the funnel is releasably coupled to the body via a friction fit.

5. The counterweight assembly of claim 1, wherein the elongate spout of the funnel and the elongate opening are coupled thereby facilitating communication between the funnel and the internal cavity of the body.

6. The counterweight assembly of claim 1, wherein the opposite portions of the funnel comprise at least two diverging, upstanding walls.

7. The counterweight assembly of claim 1, wherein the body includes at least one aperture adapted to receive a securement mechanism that is configured to retain the body in an operable connection with a counterweight receiving component.

8. The counterweight assembly of claim 7, wherein the securement mechanism comprises a fastener.

9. The counterweight assembly of claim 1, wherein the outer surface of the body has an arcuate shape.

10. The counterweight assembly of claim 1, further comprising a heavy aggregate material disposed in the internal cavity of the body.

11. The counterweight assembly of claim 1, wherein the funnel has a shape and size adapted to act as a reserve for an excess amount of the heavy aggregate material during filling of the body.

12. A counterweight assembly, the assembly comprising:
a body having an outer surface and an internal surface defining an internal cavity, and at least one aperture adapted to receive a securement mechanism, the body defining an elongate opening to the internal cavity;
a heavy aggregate material disposed within the internal cavity of the body;
a funnel extending outwardly from the body, the funnel defining a passage adapted to deliver the heavy aggregate material to the internal cavity of the body through the elongate opening defined therein, the passage of the funnel being defined by an elongate spout configured to couple to the elongate opening to the internal cavity of the body and one or more walls extending away from the elongate spout, the one or more walls comprising opposite portions diverging away from one another and extending away from the elongate spout at angles with respect thereto; and
a counterweight receiving component defining at least one aperture, wherein the securement mechanism is received by the at least one aperture of the counterweight receiving component and the at least one aperture of the body,
wherein the securement mechanism operably couples the body to the counterweight receiving component; and
wherein the body includes a central body portion having an elongate interior and lateral body portions disposed on and depending downwardly from opposite sides of the central body portion, and the elongate opening to the internal cavity is defined through a top wall of the central body portion.

13. The counterweight assembly of claim 12, wherein the funnel is integrally formed with the body.

14. The counterweight assembly of claim 12, wherein the funnel is removably coupled to the body.

15. The counterweight assembly of claim 14, wherein the funnel is removably coupled to the body via a friction fit.

16. The counterweight assembly of claim 12, wherein the elongate spout and the elongate opening are coupled thereby facilitating communication between the funnel and the internal cavity of the body.

17. The counterweight assembly of claim 12, wherein the opposite portions of the funnel comprise at least two diverging, upstanding walls.

18. The counterweight assembly of claim 12, wherein the outer surface of the body has an arcuate shape.

19. The counterweight assembly of claim 12, wherein the funnel has a shape and size adapted to act as a reserve for an excess amount of the heavy aggregate material during filling of the body.

* * * * *